United States Patent
Heissenbüttel et al.

(10) Patent No.: US 7,693,056 B2
(45) Date of Patent: Apr. 6, 2010

(54) METHOD AND SYSTEM FOR A COMMUNICATION NODE WITH A PLURALITY OF NETWORK INTERFACES

(75) Inventors: Marc Heissenbüttel, Bern (CH); Marc Danzeisen, Ittigen (CH); Jan Linder, Bern (CH); Felix Aeschlimann, Wichtrach (CH)

(73) Assignee: Swisscom Mobile AG, Bern (CH)

( * ) Notice: Subject to any disclaimer, the term of this patent is extended or adjusted under 35 U.S.C. 154(b) by 374 days.

(21) Appl. No.: 11/678,481

(22) Filed: Feb. 23, 2007

(65) Prior Publication Data

US 2007/0195765 A1 Aug. 23, 2007

(30) Foreign Application Priority Data

Feb. 23, 2006 (EP) .................................. 06110350

(51) Int. Cl.
*H04W 4/00* (2009.01)
*H04L 12/26* (2006.01)
*H04L 12/66* (2006.01)

(52) U.S. Cl. ...................... 370/230; 370/235; 370/313; 370/352

(58) Field of Classification Search ....................... None
See application file for complete search history.

(56) References Cited

U.S. PATENT DOCUMENTS

| 7,245,917 | B2 * | 7/2007 | Chiueh ........................ 455/442 |
| 7,277,434 | B2 * | 10/2007 | Astarabadi et al. .......... 370/389 |
| 7,333,482 | B2 * | 2/2008 | Johansson et al. ........... 370/353 |
| 7,356,013 | B2 * | 4/2008 | Linder et al. ................. 370/338 |
| 7,496,037 | B2 * | 2/2009 | Hughes et al. ............... 370/235 |
| 2002/0194385 | A1 * | 12/2002 | Linder et al. ................. 709/250 |
| 2004/0095932 | A1 * | 5/2004 | Astarabadi et al. .......... 370/389 |
| 2007/0109998 | A1 * | 5/2007 | Hara et al. ................... 370/331 |

FOREIGN PATENT DOCUMENTS

| DE | 198 45 486 A1 | 8/1999 |
| EP | 1 271 896 A2 | 1/2003 |
| WO | WO 2004/098130 A1 | 11/2004 |

* cited by examiner

*Primary Examiner*—Chi H Pham
*Assistant Examiner*—Soon-Dong D Hyun
(74) *Attorney, Agent, or Firm*—Oblon, Spivak, McClelland, Maier & Neustadt, L.L.P.

(57) ABSTRACT

The invention relates to a method for a communication node with a plurality of network interfaces. Configured on the communication node is a virtual interface, which is accessible from the applications able to be executed on the communication node. A configuration module generates an identifier assigned to the communication node. The identifier is stored in an identifier table. The configuration module checks the communication node for available network interfaces and sets up a network interface table with the available network interfaces. At least one IP address of an available network interface is stored in the identifier table in a way assigned to the identifier, and a connection module connects at least one of the available network interfaces to the virtual interface.

20 Claims, 1 Drawing Sheet

Abb. 1

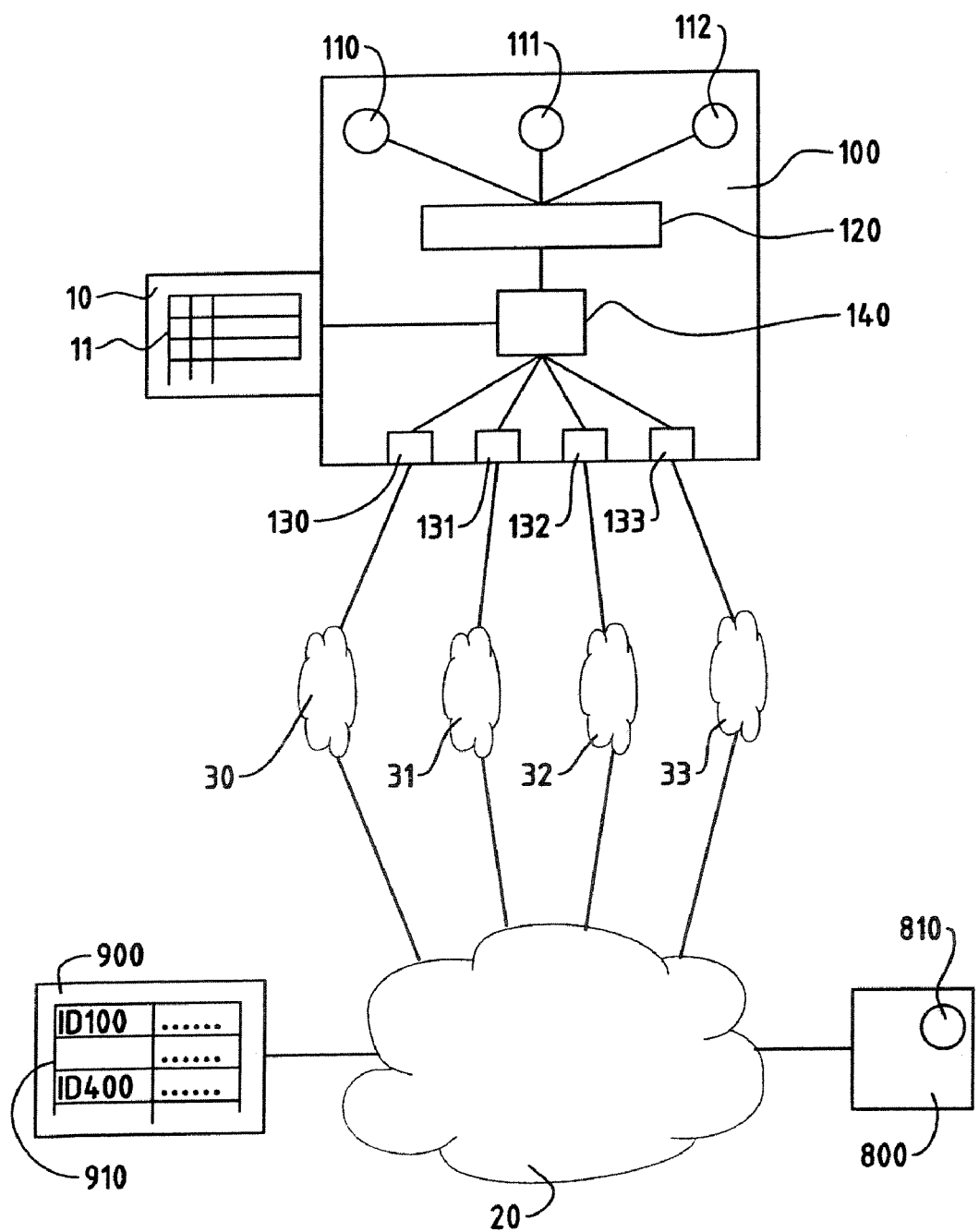
Abb. 1

METHOD AND SYSTEM FOR A COMMUNICATION NODE WITH A PLURALITY OF NETWORK INTERFACES

BACKGROUND OF THE INVENTION

1. Field of the Invention

The present invention relates to a method and a system for a communication node with a plurality of network interfaces.

2. Discussion of the Background

Communication networks and communication nodes for communication over communication networks are being produced, installed and operated in many diverse forms. Communication networks can be operated, for example, on Ethernet networks, on PSTN networks (PSTN: Public Switched Telephone Network), on mobile radio networks such as GSM or UMTS mobile radio networks (GSM: Global System for Mobile Communications, UMTS: Universal Mobile Telecommunications System), on wireless WLAN networks (WLAN: Wireless Local Area Network), on radio networks, which are operated according to the WiMAX standard (WiMAX: Worldwide Interoperability for Microwave Access), on networks which are operated according to the UWB (UWB: Ultra Wide Band) technology, on IP networks (IP: Internet Protocol), on ATM networks (ATM: Asynchronous Transfer Mode) or on Bluetooth networks. Of course, many diverse methods for data transmission can be used in such networks, such as, for example, a HSDPA method (HSDPA: High Speed Downlink Packet Access) in a UMTS network. A communication node can relate, for example, to a fixed installed computer, to a mobile radio terminal, to a communication relaying device such as a network router, or to a mobile computer, such as a notebook. In communication between communication nodes, a plurality of diverse problems must be solved, such as, for instance, reliability, speed, security, efficiency, etc. It is of advantage to structure these problems according to the OSI reference model (OSI: Open Systems Interconnection), for example, or according to the TCP/IP reference model. These reference models have a plurality of layers configured one on top of the other (OSI reference model: 7 layers, TCP/IP reference model: 4 layers), each layer being assigned certain functions. In the OSI reference model, the seven layers are a bit transmission layer (layer 1, a physical), a security layer (layer 2, data link), a relaying layer (layer 3, network), a transport layer (layer 4, transport), a session layer (layer 5, session), a presentation layer (layer 6, presentation) and an application layer (layer 7, application). The TCP/IP reference model, on the other hand, includes 4 layers, a network access layer (OSI layer 1-2, for example Ethernet), an Internet layer (OSI layer 3, IPv4, IPv6), a transport layer (OSI layer 4, TCP) and an application layer (OSI layer 5-7, for example HTTP).

A communication node has in each case at least one network interface. Such a network interface can relate, for example, to an Ethernet interface for connection to an Ethernet network, to a WLAN interface for connection to a WLAN network, or to a GSM interface for connection to a GSM mobile radio network. Depending upon the function of the communication node, the communication node has at its disposal a plurality of network interfaces. Thus a network router can have at its disposal a plurality of same-type Ethernet interfaces, or a notebook can have an Ethernet interface, a WLAN interface and a GSM interface. In particular, with mobile communication nodes, the network interfaces of the communication node must be constantly adapted to changing requirements. Thus, with private use, a communication node can be connected to the Internet via a PSTN network, for example, with use at a public location, it can be connected to the Internet via a public WLAN network, with use in a train, it can be connected to the Internet via a GSM mobile radio network, and with use in a company place of work, it can be connected to the Internet via a company-internal Ethernet network. Network parameters, such as, for example, the IP address of the communication node, must thereby be re-configured for each of these locations. In particular, the communication node thus appears in the Internet each time with a different IP address, and it is therefore not possible, for example, following a change of location of the mobile communication node, to continue to access the mobile communication node from another communication node. This problem becomes apparent with a VoIP (VoIP: Voice over IP) connection between a first communication node and a mobile communication node. With a change of the connection of the mobile communication node, for example, from a WLAN network to an Ethernet network, a new IP address is assigned to the mobile communication node. However, this assignment of a new IP address is not automatically transmitted to the first communication node, so that the first communication node is subsequently no longer able to further contact the mobile communication node, and an existing VoIP has to be interrupted, for example.

In the state of the art, solutions are known, such as, for example, mobile IP, dynamic DNS (DNS: Domain Name System) or SIP (SIP: Session Initiation Protocol), for improving the IP connectivity of mobile communication nodes. Mobile IP protocol is defined in this way by the IETF (IETF: Internet Engineering Task Force) in the RFC 2002 (RFC: Request for Comment). According to the mobile IP protocol, the mobile communication node is assigned a constantly available home address, which is configured on a constantly available network server (the so-called home agent). With a connection to a communication network or with a change between communication networks, a dynamic IP address is assigned to the communication node. This dynamically assigned IP address is designated as care-of address in mobile IP. The care-of address is then assigned to the constantly available network server of the home address. This assignment makes it possible for the mobile communication node to be always contactable, regardless of the current location, via access to the home address in that the constantly available network server forwards queries to the home address automatically to the momentary care-of address. A drawback of the mobile IP is that the assignment of a care-of address and the subsequent allocation between the home address and the care-of address on the network server can take a relatively long time, and therefore a connection may be truncated. A further disadvantage is that with an outgoing connection from the mobile communication node, the care-of address is normally used, and therefore, after a change of location, such a connection must be re-established based on a new care-of address.

Also defined by the IETF was the Internet draft "Host Identity Protocol Architecture". This Internet draft originated from the problem that two functions are simultaneously assigned to an IP address. Identified with the IP address at the same time is a communication node (or more precisely a network interface of the communication node), and the location of this communication node is identified. The IP address is a dynamic identifier for a communication node, and corresponds to a "location" in the topology of the Internet (based on the IP address). That means that the IP address of the communication node changes when the location changes. The IP address is used at the same time as a static identifier of the communication node, which is independent of the topology. With the HIP architecture (HIP: Host Identity Protocol), a separation is made possible between the function of an IP address as identifier of a communication node and the function of an IP address as identifier of the location of this communication node. In addition, a host identifier is assigned to a communication node having a network interface and an IP address. The host identifier can be generated locally on the communication node as a statically unambiguous name, a host identity tag of 128 bits being generated from the host identifier by means of a hash function. The IP address of the network interface of the communication node is assigned to the host identity tag. The transport layer protocols such as TCP and UDP are subsequently connected to the host identities (instead of to IP addresses), so that connection questions concerning a communication node always take place via a host identity. The assignment of a host identity tag to an IP address can be continuously updated in special, constantly available directories, the so-called rendezvous server. A drawback of this method is that no mechanisms are provided to make possible a dynamic connection of a communication node to a plurality of network interfaces.

Described in the European patent EP 1 271 896 is a method for mobile IP nodes in heterogeneous networks, a dynamic IP care-of address being assigned to an IP home address of a mobile communication node, and the IP care-of address indicating the current location of the mobile communication node. An interface administration module sets up a look-up table with available network interfaces of the communication node. Applications access a virtual IP network interface, the virtual IP network interface being connected to a network interface via the interface administration module, and, with a change of the network interface of the mobile communication node, the connection of the virtual IP network interface to a network interface is updated by means of the interface administration module, based on the look-up table. A drawback of this method is that only one mobile IP-based technology is able to be used, and new technologies, such as, for example, the HIP, are not able to be used. A further drawback of this method is that it becomes difficult for the operator of the communication networks to carry out resource management.

SUMMARY OF THE INVENTION

It is an object of the present invention to propose a new method and a new system for a communication node with a plurality of network interfaces, which do not have the drawbacks of the state of the art.

According to the present invention, these objects are achieved in particular through the elements of the independent claims. Further advantageous embodiments follow from the dependent claims and from the description.

In particular these objects are achieved through the invention in that a virtual interface is configured on a communication node, the virtual interface being accessible from applications able to be executed on the communication node, in that a configuration module generates an identifier, which is assigned to the communication node, the identifier being stored in an identifier table, in that the configuration module checks the communication node for available network interfaces, and sets up a network interface table with the available network interfaces, at least one IP address of an available network interface being stored in the identifier table in a way assigned to the identifier, and in that, based on the network interface table, a connection module connects at least one of the available network interfaces to the virtual interface. An available network interface is distinguished in particular in that an IP address is configured thereon, and thus has an IP connectivity. Such a method has in particular the advantage that network interfaces of the communication node can be dynamically switched on and off. Such a method also has the advantage that resource management is made possible for the operator of communication networks. Such a method has furthermore the advantage that a power management of network interfaces can be simplified. Network interfaces can be selected according to QoS requirements (QoS: Quality of Service). Network interfaces can be assigned independently of applications or of the status of applications. Thus, for example, an application with a high bandwidth requirement can be run on a network interface with a high available bandwidth.

In an embodiment variant, the identifier relates to the public key portion of a public key/private key pair stored on the communication node. Such a method has the advantage that known methods can be used for securing identification of a communication node. Thus, for example, by means of a challenge-response method, the identity of the communication node can be checked in a secure way. Thus, for example, the authentication of communication partners, an authenticated handover and/or an encryption of data communication can thereby be ensured.

In a further embodiment variant, the network interface table with the available network interfaces is dynamically checked and updated. If necessary, the at least one IP address of the network interfaces in the identifier table as well as the connection of available network interfaces to the virtual interface are updated. A dynamic checking of the available network interfaces can be triggered periodically, for example, by a user command or by any other trigger. Such a method has the advantage that the assignment between the identifier and the available IP addresses in the identifier table is constantly up-to-date.

In another embodiment variant, the dynamic checking of the network interface table is actuated by any trigger, such as, for instance, the change in the availability of a network interface, the change of the network corresponding to the network interface, or a trigger generated by an application of the communication node. Such a method has the advantage that the network interface table can be adapted immediately, for instance with a change in the configuration or with a change of functionalities of the communication node. The trigger can also be released by a device installed in the network, such as, for example, a device for transmitting a suitable message to the communication node. Thus, the operator of the communication networks can implement policies, it can carry out resource management, or it can fulfil QoS requirements. The trigger can also be released through a device set up on the communication node or through a software module running in the communication node. Thus, the checking for available network interfaces can be triggered dynamically by an application or by a TCP stack, for example, based on a high data volume. Such a dynamic checking can also be triggered in a time-delayed way in that through the devices set up in the communication networks a future availability of network interfaces is estimated. Such a future availability of network interfaces can also be transmitted to applications of the communication node, so that e.g. a large transfer of data is triggered only with the availability of a network interface with a high available bandwidth, such as, for example, a WLAN network interface.

In a further embodiment variant, data that are transmitted by applications to the virtual interface, are distributed to at least two network interfaces by means of a load-balancing module. Such a method has the advantage that available network interfaces can be used optimally.

In another embodiment variant, the distribution of the data takes place on at least two network interfaces, based on the type of data, the application, the Quality-of-Service conditions or operator policies. Thus, for example, the so-called DC portion (DC: Direct Current) of an MPEG file (MPEG: Moving Picture Experts Group) can be transmitted via a network interface with an especially robust or secure data transmission, and the so-called AC portion (AC: Alternating Current) of the MPEG file can be transmitted via a best-effort network with an especially high transmission peak power. Such a method has the advantage that the use of network interfaces can be adapted optimally to the current environment of the communication node as well as optimally to the applications of the communication node.

In a further embodiment variant, data transmitted by applications to the virtual interface, are multiply transmitted to at least two network interfaces by means of the load-balancing module. Such a method has the advantage that the sending of, e.g., time-critical data takes place simultaneously over a plurality of networks, the data being thereby transmitted with the highest possible degree of reliability. Best possible QoS requirements are fulfilled in that a soft handover (i.e. "make before break") is executed in which a plurality of technologies of network interfaces can take part.

In another embodiment variant, by means of a router module of the communication node, data is transmitted via a local communication connection between the communication node and a local communication node. Thus, the communication node can be installed in a vehicle, local communication nodes, such as a wristwatch, a play station, laptops or mobile telephones, that are connectible to the communication node over local communication connections, and, thus, an IP connectivity, free of interruption, is made available to the local communication node via different network interfaces of the communication node, for example. Such an embodiment variant has the advantage that, by means of a local communication connection, such as a Bluetooth connection, applications of local communication nodes, such as a wristwatch, can also be optimally connected to a plurality of networks via a plurality of network interfaces.

In a further embodiment variant, data intended for the communication node is first sent to a central module set up in a communication network, the central module carrying out a load balancing over available network interfaces of the IP node in accordance with definable criteria. Such a central module can be a software module able to run on a network server, for example, the central module being able to receive data from the Internet via network interfaces of the network server, on the one hand, and, on the other hand, being able to forward data in such a way that the forwarded data is able to be received via definable network interfaces of the communication node. Such a method has the advantage that different available network interfaces of the communication node are able to be optimally used for receiving data. This provides operators of communication networks the ability to simply implement policies, resource management or power management.

In a further embodiment variant, outgoing data is stored in a data buffer of the communication node, the forwarding of data from the data buffer to a network interface being controlled in accordance with availability of network interfaces. Such a data buffer can be set up, for example, in a virtual interface or in the connection module. Such a method has the advantage that, compared with applications of the communication node, in keeping with the size of the data buffer, a network interface is constantly available during a definable time interval, so that the applications are able to send data in such a time interval without interruption, without the application having to interrupt the data stream. Thus, it can be hidden from the applications that, at the moment, no communication is possible, and a reduction in the throughput via TCP mechanisms can be prevented. Of course, an interruption of the communication vis-à-vis applications not using TCP is also concealed.

BRIEF DESCRIPTION OF DRAWINGS

Embodiment variants of the invention are described in the following with reference to examples. The examples of the embodiments are illustrated by the following attached FIGURE:

FIG. 1 shows a block diagram with the individual components of a method and system according to the invention for a communication node with a plurality of network interfaces.

DESCRIPTION OF THE PREFERRED EMBODIMENTS

In FIG. 1, the reference numeral 100 designates a communication node. The communication node 100 can be any communication node for communicating over a communication network, such as, for example, a mobile telephone for communication over a GSM or UMTS communication network, a mobile notebook for communication over a WLAN communication network or a fixed-installed computer for communication over an Ethernet communication network. The communication node 100 can also relate to a mobile server, a mobile proxy, a mobile router or any other mobile computer, for instance.

The communication node 100 has a plurality of network interfaces 130, 131, 132, 133 for communication over different communication networks 30, 31, 32, 33. Shown in FIG. 1 are four network interfaces and four communication networks. It is clear to one skilled in the art, however, that the method according to the invention relates to any number of network interfaces and respective communication networks. The communication networks 30, 31, 32, 33 can relate to any communication networks, for example to communication networks of different technologies, such as a GSM, a UMTS, a WLAN or an Ethernet communication network, or to communication networks of the same technology, such as, for instance, a GSM communication network of a first provider and to a GSM communication network of a second provider. Of course it is possible for the communication networks of the same technology not to be limited just to GSM communication networks, but to relate to WLAN communication networks, Ethernet communication networks, UMTS communication networks or to any other communication networks. Within such communication networks of the same technology, administrative domains can be formed such as, for example, an administrative domain for administration of different IP sub-networks. Communication networks of the same technology can also be separated by administrative domains, such as a domain for users of a first user class and a domain for users of a second user class. With such a separation into user classes, different rates and/or service qualities can be defined. Of course the network interfaces 130, 131, 132, 133 have the necessary hardware and software components such as bus connections, decoders, encoders, modulators, etc., for communication via communication networks 30, 31, 32, 33.

In FIG. 1, the reference numeral 120 relates to a virtual interface. The virtual interface 120 is implemented, for example, as a software module able to run on the communication module 100. The virtual interface 120 is accessible through applications 110, 111, 112 of the communication node 100. It can thereby be ensured that, from the point of view of the applications 110, 111, 112, the virtual interface 120 behaves as a real network interface. The virtual interface 120 comprises a virtual IP address, a virtual MAC address (MAC: Media Access Control) or any other virtual object that has a relationship to a real object of a network interface. The virtual interface can be located logically on any layer within the communication protocol stack. The virtual interface 120 is preferably implemented according to the HIP protocol, so that applications with a host identity tag and a port number access the virtual interface, so that data is transmitted between the virtual interface and the application, and so that the successful transmission of data is signalled to the applications through the virtual interface, for example.

In FIG. 1, the reference numeral 10 relates to a configuration module, and the reference numeral 140 relates to a connection module. As shown in FIG. 1, the configuration module 10 can be set up on the communication node 100. The configuration module 10 can also be connectible via a connection to the communication node 100. The configuration module 10 can also be set up in the communication node 100. The configuration module has means of checking the communication node 100 for available network interfaces. As shown in FIG. 1, such means can relate to a connection to the connection module 140, the connection module 140 having means of connection to the network interfaces 130, 131, 132, 134, as shown once again in FIG. 1. Both the configuration module 10 as well as the connection module 140 can each be implemented as software modules able to run on the communication node 100. The connection module 140 has means of connecting the virtual interface 120 to one or more network interfaces 130, 131, 132, 133. The configuration module 10 also has means of generating or administrating an identifier ID100. The identifier ID100 can relate, for example, to a public key portion of a public key/private key pair. The identifier ID100 can also relate to a HIT (HIT: Host Identity Tag) defined according to the Internet draft "Host Identity Protocol Architecture." The identifier ID100 can also be formed in any other way, however. The identifier ID100 is normally stored in a memory of the network node. The identifier ID100 can also relate to the network node, and be assigned to the network node. The identifier ID100 can also relate to the virtual interface 120, so that a plurality of identifiers ID100, ID200, etc. can be assigned to a network node with a plurality of virtual interfaces.

In FIG. 1, the reference numeral 900 relates to a central unit for storing an identifier table 910. As will still be shown in the following, the central unit 900 can also be configured as a distributed device. Such a central unit can be implemented as a software module able to run on a server, for example. The central unit can relate, for example, to a DNS server (DNS: Domain Name System). The central unit 900 can also relate, however, to a dedicated central unit having the following described functions. By means of the central unit 900, at least one IP address is stored in the identifier table 910 in a way assigned to the identifier IDI100. Thus, for instance, a central unit such as a DHCP server (DHCP: Dynamic Host Configuration Protocol) of a communication network 30 can dynamically assign an IP address to the network interface 130, as soon as the network interface 130 is connected physically to the communication network 30. Such a physical connection can relate both to a wireless connection, such as, for example, a wireless connection to a WLAN communication network as well as to a wired connection, such as, for instance, a twisted pair connection to an Ethernet communication network. As soon as the network interface 130 is assigned an IP address, this IP address can be configured on the network interface 130, and the network interface 130 can be connected to the virtual interface 120 through the connection module 140. A communication connection is thereby established between the communication node 100 and in particular the applications 110, 111, 112 and the communication network 30. The communication node 100 subsequently has an IP connectivity to the communication network 30, and to any further communication networks, such as the Internet, via a connection between the communication network 30 and a further communication network 20, for example. After the IP connectivity of the communication node 100 is established, entries in the identifier table 910 can be updated, for example. Thus, through the connection module 140, a connection to the central unit 900 can be set up, the entries in the table for the identifier ID 100 of the communication node being updated by means of a corresponding transmission of data and commands between the connection module 140 and the central unit 900. These table entries comprise the current configured IP addresses of network interfaces 130, 131, 132, 133 of the communication node 100. Analogously, identifiers and IP addresses can be stored for any further network nodes. The identifier table 910 thus consists of identifiers ID100, ID200, ID400, etc., which relate to a communication node or a virtual interface of the communication node, as well as of IP addresses assigned to each of the identifiers ID100, ID200, ID400, etc., relating to the network interfaces 130, 131, 132, 133 of the communication node. Thus, for example, assigned to the identifier ID100 can be three IP addresses (e.g. IP1 of the network interface 130, IP2 of the network interface 131 and IP3 of the network interface 132). Thus the communication node 100 has EP connectivity of the network interfaces 130, 131 and 132. By means of the connection module 140, a definable number of the network interfaces 130, 131, 132, 133 can be connected to the virtual interface 120. Expediently, only network interfaces having IP connectivity are connected to the virtual interface.

As mentioned, the central unit 900 can also be configured as distributed device. Thus identifiers ID100, ID200, ID400 and assigned IP addresses can be stored in a database. Such a database can be hierarchical, such as in DNS, for example, or can be stored in a way similar to in a P2P network (P2P: peer to peer) in distributed hash tables, for instance, or similarly distributed tables. Even the assignment of an identifier ID100 to an IP address can be stored in a distributed way. Thus in a first table, a first IP address IP1 and a second IP address IP2 can be assigned to the identifier ID100, and in a second table the second IP address IP2 and a third IP address IP3 likewise assigned to the identifier ID100. This can have the advantage that, depending upon the location of a communication node, for instance, a connection of this communication node to the communication node identified through the identifier ID100 can be carried out via different network interfaces of this communication node, and can thereby be optimized, for instance in relation to QoS requirements.

In FIG. 1, the reference numeral 800 refers, for example, to any second communication node. The second communication node 800 can thereby be a communication node according to the invention or any other communication node. Communication connections for transmission of data can be established between the communication node 100 and the second communication node 800, as described in the following.

Such communication connections have in particular the aim that data can be transmitted between one application 110 of the communication node 100 and a second application 810 of the second communication node 800. Thus, the application 110 can relate, for instance, to a browser for display of HTML description pages (HTML: Hypertext Markup Language), and the second application 810 can relate to an http daemon of a web server. Thus, over a communication link, data queries must be transmitted from the application 110 to the second application 810, and, over the same connection and a further connection, response data must be transmitted from the second application 810 to the application 110.

The application 110 transmits in addition the request data to the virtual interface 120. Thus, vis-à-vis the application 110, the virtual interface 120 appears as a normal network interface, and comprises a virtual IP address as well as a virtual MAC address, for example. Of course, the request data comprise an identifier ID800 for identification of the second communication node 800, or a virtual interface of the second communication node, as well as a port number for identification of an application of the second communication node 800. Of course, instead of a port number for identification of an application of the second communication node 800, any other method can be used to identify an application or a receiving module of the second communication node. Based on the identifier ID800, at least one IP address of the second communication node is now determined. This can take place by look-up in the identifier table. Such a look-up can be accomplished through the virtual interface 120, or also through the connection module 140. The request data is then transmitted by means of the virtual interface 120 to the connection module 140. If need be, the request data are supplemented or modified, such as replacing the identifier ID800 with a corresponding IP address, for example. To identify the sender of the request data, the request data can further comprise an IP address of the communication node or an identifier ID100, as well as a port number for identification of the application which has sent the request data. By means of the connection module 140, the request data is transmitted to at least one of the network interfaces 130, 131, 132, 133. From the corresponding at least one network interface, the request data is transmitted to the assigned communication network, and by means of usual transport mechanisms, for example over the communication network 20, to the communication node 800. Corresponding to the port number, the request data can be transmitted to the second application 810 of the second communication node 800, and can be evaluated by the same. Such an evaluation of the request data can lead to response data being transmitted from the second application 810 to the application 110. Such response data can comprise an identifier ID100 of the communication node 100 as well as a port number for identification of the application 110. Based on the identifier ID100, the second communication node can determine an IP address of the communication node 100, for example by means of a look-up in the identifier table 910. The second communication node can also determine this IP address directly, for instance peer-to-peer, or simply transmit the response data to the transmitting address, which transmitting address can be determined from the received request data, for example, through an examination of the data of an IP header. By means of usual transport mechanisms, the response data can be transmitted to at least one of the network interfaces 130, 131, 132, 133, whereby, by means of the connection module 140, the response data is transmitted to the virtual interface, and, by means of the virtual interface, and based on a port number corresponding to the application 110, the response data is transmitted to the application 110.

The connecting module 140 can comprise a load-balancing module. Thus, in checking the communication node 100 for available network interfaces 130, 131, 132, 133, additional parameters can be checked. Such parameters can relate to Quality of Service parameters such as a maximal data rate, reliability, the error ratio in the transmission of data packets, the network load or any other Quality of Service parameters. These parameters can also relate, however, to the costs of a network connection, to policies of the operator, or to any other parameters. Thus, a policy of an operator may be instituted that certain networks can be used at an especially cheap rate at certain times of day for certain customers. Or the policy of an operator can be instituted that as soon as the number of communication nodes using the communication network of the operator exceeds a certain number or a particular overall data bandwidth, a switch is made to a different billing rate. It is clear to one skilled in the art that a large number of other definitions exist for such or similar parameters as well as to check network interfaces for such parameters. By means of the load-balancing module, such a data transmission can be adapted according to the available network interfaces. Thus, for example, a network interface 130 can be connected to a GSM network, and a network interface 131 can be connected to a WLAN network at the same time. A user can now request the transmission of a video file from a network server, for example. It can be necessary for the user to transmit a credit card number to a server for clearance of the video file before transmission of the video file. It is possible that the physical connection to the WLAN network is based only on an unencrypted communication connection. The connection module 140 can be set up such that data which is supposed to be transmitted from an application to a network interface must be constantly checked at a required security level, for example. In addition, the connection module 140 can be set up such that data is normally transmitted via the network interface with the largest bandwidth. The connection module 140 can now be set up such that, upon recognition of data of a higher security level, such as recognition of the transmission of credit card data, for example, this data is transmitted via a network interface 130 of a higher security level. Of course one skilled in the art can derive from this example a large number of corresponding, similar or obvious procedural methods for transmitting data via different available network interfaces in accordance with definable parameters by means of the load-balancing module. It should be noted that the load-balancing module can be set up such that the transmission of data takes place in accordance with the application transmitting the data for forwarding. Thus, with simultaneous availability of a GSM network interface and a UMTS network interface, the load-balancing module can be set up such that the transmission of email messages of an email application always takes place over the GSM network interface, and the transmission of a video application always takes place over the UMTS network interface. Of course, a large number of corresponding, similar or obvious procedural methods are known to one skilled in the art for transmitting data corresponding to the application via various available network interfaces 130, 131, 132, 133 by means of the load-balancing module.

The modules and components of the communication node 100 can be distributed on a plurality of physical devices. Thus, the virtual interface can be set up in a first physical device, and the connection module can be set up in a second physical device. Of course, a first physical device such as, for example, a wristwatch, can also have just one application and one physical local network interface, such as a Bluetooth network interface, and a second physical device such as, for example, a mobile telephone, can have a corresponding physical local network interface, such as a Bluetooth network interface, the second physical device being able to include the components according to the invention, such as the virtual interface, the connection module as well as the plurality of network interfaces. By means of such a separation it is possible for the components set up in the first physical device (the wristwatch) to be miniaturized particularly well and to be of especially energy efficient design. The second physical device can be set up such that a plurality of first physical devices are able to be connected via the local network interface, so that a router is formed for a local network by the second physical device, with which router access is possible to different networks over different network interfaces of the router. The distribution of an architecture, consisting of a configuration module 10, a connection module 140, a virtual interface 120, applications 110, 111, 112 and network interfaces 130, 131, 132, 133 can take place in almost any desired way. These elements can be disposed on different devices, and can be brought into interaction according to the invention, if necessary, via suitable additional interfaces. Thus, for example, the network interfaces 130, 131, 132, 133 can be disposed on one device, and the configuration module 10, the connection module 140, the virtual interface 120 and the applications 110, 111, 112 on another device. Or, for instance, the network interfaces 130, 131, 132, 133 can be disposed on a first device, the configuration module 10 and the connection module 140 on a second device, and the virtual interface 120 and the applications 110, 111, 112 on a third device.

The invention claimed is:

1. A method of connecting a communication node with a plurality of network interfaces, comprising:
    configuring a virtual interface of the communication node, the virtual interface being accessible by applications being executed on the communication node;
    generating, by a configuration module of the communication node, an identifier that intrinsically identifies the communication node, and storing the identifier in an identifier table so that a plurality of IP addresses, each corresponding to one of the plurality of network interfaces respectively, is assigned to the identifier;
    checking, by the configuration module of the communication node, the communication node for available network interfaces, and setting up a network interface table storing available network interfaces by storing information including at least one IP address of an available network interface assigned to the identifier in the identifier table; and
    connecting, by a connection module of the communication node, at least one of the available network interfaces to the virtual interface based on the information stored in the network interface table.

2. The method according to claim 1, wherein the identifier relates to a public key portion of a public key/private key pair stored on the communication node.

3. The method according to claim 1, further comprising:
    checking the network interface table with the available network interfaces; and
    updating the at least one IP address of the network interface in the network interface table as to the available network interfaces for connecting to the virtual interface.

4. The method according to claim 3, wherein the checking of the network interface table is actuated by any change in the availability of a network interface, any change of the network corresponding to the network interface, or a trigger generated by an application being executed on the communication node.

5. The method according to claim 1, further comprising:
    transmitting data to the virtual interface by applications being executed on the communication node; and
    distributing the data on at least two network interfaces by a load-balancing module.

6. The method according to claim 5, wherein the distributing the data takes place on at least two network interfaces based on a type of data, an application, quality of service requirements, or operator policies.

7. The method according to claim 5, further comprising multiply transmitting the data to the at least two network interfaces by the load-balancing module.

8. The method according to claim 1, further comprising:
    transmitting data via a local communication connection between the communication node and a local communication node by a router module.

9. The method according to claim 5, further comprising:
    receiving data intended for the communication node at a central module in a communication network; and
    carrying out a load balancing, at the central module, via available network interfaces of the communication node in accordance with definable criteria.

10. The method according to claim 1, further comprising:
    temporarily storing outgoing data in a data buffer of the communication node; and
    forwarding the outgoing data from the data buffer to a network interface, the forwarding being controlled based on the availability of network interfaces.

11. A communication system comprising:
    a communication node including executable applications and a plurality of network interfaces,
    wherein the communication node is configured to execute a virtual interface accessible by the applications executable on the communication node;
    a configuration module, communicatively coupled to the communication node, configured to generate an identifier that intrinsically identifies the communication node, and is stored in an identifier table so that a plurality of IP addresses, each corresponding to one of the plurality of network interfaces respectively, is assigned to the identifier,
    wherein the configuration module is configured to check the communication node for available network interfaces and to configure a network interface table to store information including the available network interfaces and at least one IP address of an available network interface assigned to the identifier; and
    a connection module, communicatively couple to the communication node, configured to connect at least one of the available network interfaces to the virtual interface based on the information stored in the network interface table.

12. The system according to claim 11, wherein the identifier consists of a public key portion of a public key/private key pair stored on the communication node.

13. The system according to claim 11, wherein the communication node is configured to dynamically check the network interface table with the available network interfaces, and to dynamically update the at least one IP address of the network interface in the network interface table as to the available network interfaces for connection to the virtual interface.

14. The system according to claim 13, wherein the communication node is configured to check the network interface table in response to a change in availability of a network interface, a change of a network corresponding to the network interface, or a trigger generated by execution of an application of the communication node.

15. The system according to claim 11, wherein the applications executed by the communication node transmit data to the virtual interface, and the system further comprises:
a load-balancing module configured to distribute the data then on at least two network interfaces.

16. The system according to claim 15, wherein the load-balancing module distributes the data on at least two network interfaces based on a type of data, an application, quality-of-service conditions, or operator policies.

17. The system according to claim 15, wherein the load-balancing module multiply transmits the data to the at least two network interfaces.

18. The system according to claim 11, further comprising:
a local communication node; and
a router module communicatively coupled to the communication node and the local communication node,
wherein data is transmitted over a local communication connection between the communication node and the local communication node by the router module.

19. The system according to claim 15, further comprising:
a central module communicatively coupled to the communication node,
wherein data intended for the communication node is first received at the central module, and the central module is configured to carry out a load balancing in accordance with definable criteria.

20. The system according to claim 11, further comprising
a data buffer configured to temporarily store outgoing data from the communication node,
wherein forwarding of the outgoing data from the data buffer is controlled based on the availability of network interfaces.

* * * * *

UNITED STATES PATENT AND TRADEMARK OFFICE
CERTIFICATE OF CORRECTION

PATENT NO. : 7,693,056 B2  
APPLICATION NO. : 11/678481  
DATED : April 6, 2010  
INVENTOR(S) : Marc Heissenbuettel et al.

Page 1 of 1

It is certified that error appears in the above-identified patent and that said Letters Patent is hereby corrected as shown below:

On the title page, Item (73), should read:

-- (73) Assignee: Swisscom AG, Bern (CH) --

Signed and Sealed this
Fifth Day of April, 2011

David J. Kappos
*Director of the United States Patent and Trademark Office*